Jan. 20, 1931.  J. SNEED  1,789,392
BRAKE ADJUSTER
Filed Sept. 6, 1929
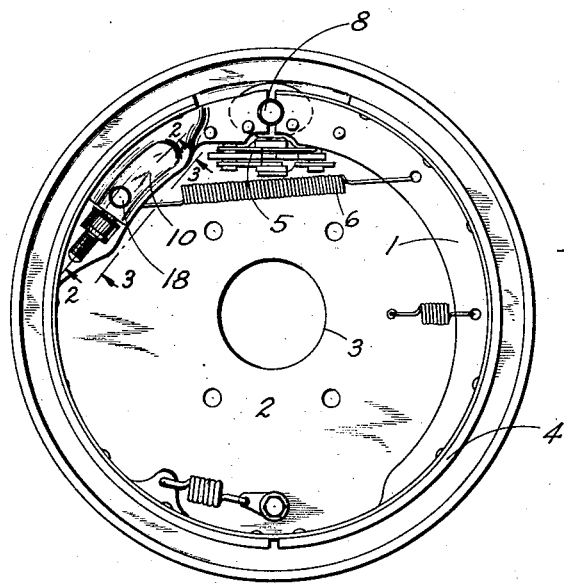
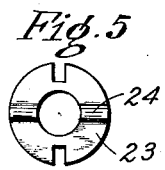
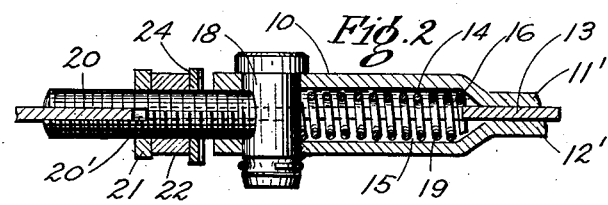
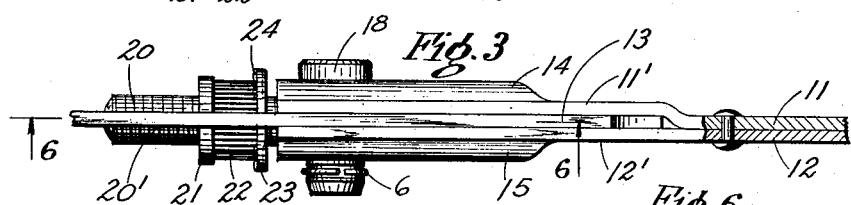
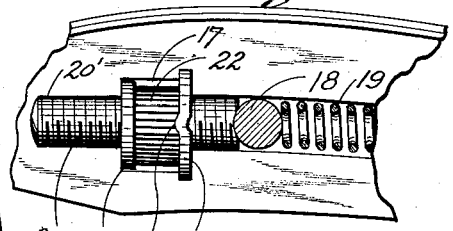
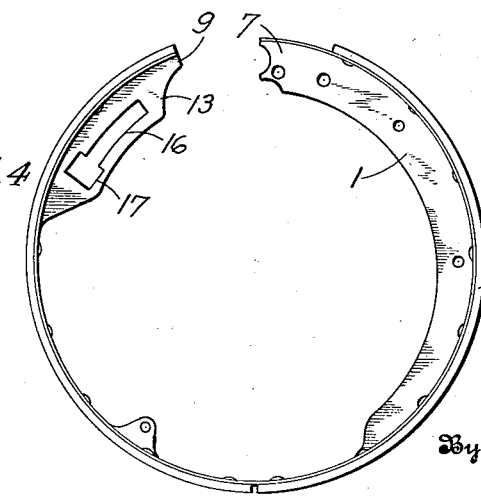
Inventor
JOHN SNEED
By Richey & Watts
Attorneys Patented Jan. 20, 1931

1,789,392

UNITED STATES PATENT OFFICE

JOHN SNEED, OF FERNDALE, MICHIGAN, ASSIGNOR TO THE MIDLAND STEEL PRODUCTS COMPANY, TRUSTEE, OF CLEVELAND, OHIO, A CORPORATION OF OHIO

BRAKE ADJUSTER

Application filed September 6, 1929. Serial No. 390,663.

This invention relates to brakes and more particularly to means for adjusting automotive brakes to compensate for wear and secure the proper braking action.

Automobile brakes are subjected to very severe usage and it is necessary at certain intervals to adjust them to compensate for wear on the brake lining. It is well known practice to secure this adjustment by providing means for varying the effective length of the brake shoe to which the brake lining is attached. By such adjustment it is possible to control the clearance between the brake lining and the brake drum and thus secure proper braking action of each brake of the vehicle.

In this specification and in the accompanying drawings I have described and illustrated my improved brake adjuster as applied to a brake of the single shoe self-energizing type but it will be clear to those skilled in the art that my improvement may be readily applied to other types of brakes.

Among the objects of my invention are the provision of means for adjusting the effective circumferential length of a brake shoe to secure the proper clearance between the shoe and the brake drum; the provision of a brake adjusting mechanism which will remain fixed at any particular adjustment but which may be easily actuated when it is desired to change the adjustment; the provision of a brake adjusting mechanism which is adapted to be economically manufactured and which is of rugged end efficient design. These and other objects of my invention will be clear from the following description of a preferred embodiment of my improved brake adjuster, reference being had to the accompanying drawings. The essential characteristics are summarized in the claims.

In the drawings, Fig. 1 is a side elevation of a brake equipped with my adjusting mechanism; Fig. 2 is a section through my adjusting mechanism taken on the line 2—2 of Fig. 1; Fig. 3 is a view taken on the line 3—3 of Fig. 1; Fig. 4 is a detached view of the brake shoe shown in assembly in Fig. 1; Fig. 5 is a detached view of the locking washer which holds my adjusting mechanism in the desired position; Fig. 6 is a section taken on line 6—6 of Fig. 3.

The brake illustrated in Fig. 1 of the drawings is of the type fully described and claimed in my copending United States patent application Serial No. 347,515, filed March 16, 1929.

The brake shoe 1 is supported adjacent the apron 2 which is rigidly secured to the vehicle axle. The apron 2 is provided with a central aperture 3 through which the wheel carrying portion of the axle may extend. A brake drum is mounted on the wheel and is adapted to enclose the brake shoe 1. The axle, brake drum and wheel are not shown in the drawings but may be of any suitable type. When the brake is in the off position the brake lining 4, which is secured to the outer circumference of the shoe 1, is held out of contact with the inner surface of the brake drum. When the brake is applied the movement of the actuating pedal or lever is transmitted through suitable connections to the toggle arms 5 which are connected to the ends of the shoe in such a manner that their movement expands the shoe. The brake lining is thus forced into contact with the brake drum and this force, together with the self-energizing effect which is a characteristic of the particular type of brake illustrated, produces the braking friction between the drum and the brake lining. A spring 6 is connected to the shoe 1 across its open ends and serves to hold the brake lining out of contact with the drum when there is no force exerted on the operating pedal or lever.

When the brake is in the off position, one end 7 of the shoe 1 bears against an anchor stud or pin 8. The other end 9 of the shoe 1 stops short of the pin 8 but is held in definite relation to it by the adjustable bifurcated extension member 10. The end of the adjustable member 10 also bears against the pin 8 on the opposite side from the end 7 of the shoe 1. The pin 8 is fixed in the apron 2 and serves to transmit the braking torque from the shoe 1 to the apron 2 in well known manner. The spreading mechanism engages the shoe end 7 and the member 10 so that adjustment of the brake does not effect the spreading mechanism.

I prefer to form the shoe in the manner and according to the process illustrated and described in my copending application Serial No. 347,517, filed March 16th, 1929. In that application I have described how the shoe is rolled into a split ring having inwardly extending radial flanges of uniform depth and how thereafter certain portions of the flange are sheared away to lend flexibility to those portions. In the instant case, I have perfected the method and form of the shoe by shearing away all of the flange from a point near the adjuster to a point a little beyond the mid portion of the shoe with the exception of one small part which is retained to form an eyelet for the retractor spring.

The adjustable extension member 10 comprises a pair of plates 11 and 12 held together by suitable means, such as rivets, at one end and having offset portions 11' and 12' adapted to fit on either side of an inwardly extending flange 13 on the shoe 1. Longitudinally extending cylindrical depressions 14 and 15 are formed on the offset ends or prongs 11' and 12' of the bifurcated adjusting member 10. A slot 16 having enlarged portions 17 is cut in the flange 13. The offset portions 11' and 12' of the adjusting member 10 straddle the flange 13 and are held in place by a pin 18 which passes through holes in the cylindrical portions 14 and 15 of the adjusting member 10 and also through the slot 16. A coil spring 19 lies in the cylindrical aperture formed by the depressions 14 and 15 in the adjusting member 10 and the slot 16. One end of the spring 19 bears against the end of the slot 16 and the other end bears against the pin 18. An adjusting screw 20 has a slotted end portion 20' which fits over the flange 13. The opposite end of the screw 20 passes through a washer 21, threaded adjusting nut 22 and a locking washer 23 and abut against the opposite side of the pin 18 from the spring 19. The thrust washer 21, adjusting nut 22 and the locking washer 23 are disposed in the enlarged portion 17 of the slot 16.

The spring 19 is of such length that it is always compressed a certain degree when it is in position and therefore pushes against the pin 18 to hold it in contact with the end of the adjusting screw 20. It also serves to hold the adjusting member 10 in its proper position as an extension of the shoe 1 by virtue of the fact that the spring 19 fits in the cylindrical aperture formed in the offset portions 11' and 12' and thus supports the adjusting member 10 against movement in a vertical plane except when it is moved by the nut 22.

The locking washer 23 as seen in Fig. 5, has diametrically opposite slots cut in its periphery which slots are adapted to engage the flange 13 and prevent the washer from rotating. It is also provided with depressed portions 24 which may coact with depressions in the end of the adjusting nut 22 to hold the nut in any desired position. It will be seen that when the adjusting nut 22 is turned the screw 20 will be moved in a direction either toward or away from the adjusting member 10 depending on which way the screw is rotated. If it is desired to increase the effective length of the shoe, the adjusting screw 22 will be turned in the direction which will cause the screw 20 to push against the pin 18 moving it in the slot 16, and with it the adjusting member 10. Conversely if it is desired to decrease the effective length of the shoe 1 to give more clearance between the brake lining and the brake drum, the nut 22 will be turned in the opposite direction. This will cause the screw 20 to be moved away from the pin 18 and as this movement takes place the spring 19 will keep the pin 18 in contact with the end of the screw 20 thus moving the adjusting member 10 in a direction to shorten the effective length of the shoe 1.

The coacting depressions on the nut 22 and washer 23 act as means for indicating the degree of adjustment which has been made on the brake shoe as well as serving to lock the adjusting member in any desired position. The spring 6 which holds the brake shoe in its contracted position may be attached at one end to the end of the pin 18, as shown in the drawings, although this construction is not of paramount value to my improved adjusting mechanism.

I have illustrated my invention as applied to but one particular type of automotive brake but it will be clear to those skilled in the art that it may be readily adapted for adjusting the effective length of brake shoes of other types of brakes than the specific form illustrated, and I do not wish to be limited in any way other than by the claims appended hereto.

I claim:—

1. In a brake, the combination of a shoe having an inwardly extending flange, an adjuster for changing the effective length of said shoe having a slot in which said flange fits, screw means for moving said adjuster in one direction and spring means for moving said adjuster in the opposite direction when said screw means is released.

2. In apparatus of the class described the combination of a brake shoe having an inwardly extending flange, an adjusting member adapted to engage said flange and to extend circumferentially beyond one end of said shoe, and screw means adapted when turned in one direction to move said adjusting member to increase the effective length of said shoe and when turned in the opposite direction to allow said adjusting member to be moved to decrease the effective length of said shoe.

3. In a brake, the combination of a brake shoe having a flange projecting inwardly therefrom, a slot in said flange, an adjusting member adapted to engage said flange, a pin extending through said adjusting member and said slot, a screw disposed in said slot and adapted to engage one side of said pin, a spring in said slot adapted to be held in compression between the opposite side of said pin and one end of said slot and a nut on said screw adapted when rotated to move said screw and said adjusting member to change the effective length of said brake shoe.

4. A brake adjusting member comprising a pair of plates secured together at one end and having spaced offset portions at their opposite ends, said spaced offset portions having longitudinally extending depressions forming a cylindrical aperture between said plates.

5. A brake adjusting member having a bifurcated end portion, the prongs of said bifurcated portion each having a depressed portion extending longitudinally from the ends of said prongs.

6. Apparatus for adjusting the effective length of a brake shoe comprising a slotted flange extending inwardly from said shoe and attached thereto, a bifurcated adjusting member disposed with its prongs on opposite sides of said flange, means for maintaining said adjusting member in slidable relation to said flange, and screw and spring controlled regulating means for moving said adjusting member to increase or decrease the effective length of said brake shoe.

7. Apparatus for adjusting the effective length of a brake shoe comprising a slotted flange extending inwardly from said shoe and attached thereto, a bifurcated adjusting member, means for maintaining said bifurcated member in position with its prongs on opposite sides of said flange and slidable longitudinally of the slot therein, screw means for sliding said adjusting means longitudinally of said slot to increase the effective length of said shoe and spring means for sliding said adjusting means longitudinally of said slot to decrease the effective length of said shoe.

8. Apparatus for varying the length of a brake shoe comprising a flange on said shoe, a coacting adjusting member slidably secured to said shoe, a screw adapted to move said adjusting member in one direction and a spring adapted to move said adjusting member in the opposite direction.

9. In combination a shoe having a radial slotted flange; an adjusting member having parts engaging opposite sides of said flange, a pin carried by said member extending through said flange and screw means engaging said pin.

10. In combination a brake shoe having a radial slotted flange, an adjuster having parts on opposite sides of said flange, a pin extending through the flange and carried by the adjuster, a slotted screw slidably and non-rotatably engaging said flange and said pin, means for sliding said pin and means for opposing its movement as urged by said first means.

In testimony whereof I hereunto affix my signature this 30th day of August, 1929.

JOHN SNEED.

DISCLAIMER 1,789,392.—*John Sneed*, Ferndale, Mich. BRAKE ADJUSTER. Patent dated January 20, 1931. Disclaimer filed June 3, 1935, by the patentee, and the assignee, *The Midland Steel Products Company*, as trustee for *Steeldraulic Brake Corporation*.

Hereby disclaim from the aforesaid patent claims Nos. 1 and 2 which are in the following words, to wit:

"1. In a brake, the combination of a shoe having an inwardly extending flange, an adjuster for changing the effective length of said shoe having a slot in which said flange fits, screw means for moving said adjuster in one direction and spring means for moving said adjuster in the opposite direction when said screw means is released.

"2. In apparatus of the class described the combination of a brake shoe having an inwardly extending flange, an adjusting member adapted to engage said flange, and to extend circumferentially beyond one end of said shoe, and screw means adapted when turned in one direction to move said adjusting member to increase the effective length of said shoe and when turned in the opposite direction to allow said adjusting member to be moved to decrease the effective length of said shoe."

[*Official Gazette June 25, 1935.*]